(12) United States Patent
Brandt (10) Patent No.: US 7,970,181 B1
(45) Date of Patent: Jun. 28, 2011

(54) METHODS AND SYSTEMS FOR EXAMPLE-BASED IMAGE CORRECTION

(75) Inventor: Jon Brandt, Santa Cruz, CA (US)

(73) Assignee: Adobe Systems Incorporated, San Jose, CA (US)

( * ) Notice: Subject to any disclaimer, the term of this patent is extended or adjusted under 35 U.S.C. 154(b) by 991 days.

(21) Appl. No.: 11/837,017

(22) Filed: Aug. 10, 2007

(51) Int. Cl.
*G06K 9/46* (2006.01)
*G06K 9/74* (2006.01)

(52) U.S. Cl. ........ 382/117; 382/167; 382/274; 382/275; 382/283

(58) Field of Classification Search .......................... None
See application file for complete search history.

(56) References Cited

U.S. PATENT DOCUMENTS

| | | | |
|---|---|---|---|
| 2004/0141657 A1* | 7/2004 | Jarman | 382/275 |
| 2004/0160517 A1* | 8/2004 | Iida | 348/207.99 |
| 2004/0165787 A1* | 8/2004 | Perez et al. | 382/284 |
| 2004/0233301 A1* | 11/2004 | Nakata et al. | 348/239 |
| 2005/0280717 A1* | 12/2005 | Sugimoto | 348/222.1 |
| 2006/0082847 A1* | 4/2006 | Sugimoto | 358/518 |
| 2006/0280361 A1* | 12/2006 | Umeda | 382/167 |
| 2007/0273769 A1* | 11/2007 | Takahashi | 348/222.1 |

FOREIGN PATENT DOCUMENTS

JP 2006180160 A * 7/2006

OTHER PUBLICATIONS

English Abstract of JP2006180160A, Oda et al. Jul. 6, 2006, 2 pages.*
William T. Freeman, et al., *"Example-Based Super-Resolution,"* Image-Based Modeling, Rendering and Lighting, Mar./Apr. 2002, pp. 56-65.
Aaron Hertzmann, et al., *"Image Analogies,"* Microsoft Research, University of Washington. Siggraph 2001 paper, 14 pages.

* cited by examiner

*Primary Examiner* — Brian P Werner
(74) *Attorney, Agent, or Firm* — Kilpatrick Townsend & Stockton LLP (57) ABSTRACT

Certain embodiments of the present invention provide methods and systems for correcting new images using example image sets, automatically or with user interaction, to produce corrected images in a manner that can be adapted to individual preferences, different image object orientations, image illumination conditions, and/or human and non-human features. In one embodiment, example image sets are provided that include information. The information can include a corrected example image, an original example image, and an example image mask. The example image mask includes information regarding the pixels corrected in the corrected example image. A new image is received that includes a defective area that needs to be corrected. The new image can be corrected using the information associated with the example image set.

24 Claims, 7 Drawing Sheets

METHODS AND SYSTEMS FOR EXAMPLE-BASED IMAGE CORRECTION

FIELD OF THE INVENTION

The present invention relates generally to example-based image correction and more specifically to methods and systems for using example images to correct new images.

BACKGROUND

Images that contain one or more objects may be viewed, developed, and modified using a software application. Objects may be any object represented in the image using pixels of one or more colors. Examples of objects include humans, non-human animals, trees, buildings, and products. Images can be obtained via a digital camera or otherwise, and provided to a software application. The software application can be used to view the image and modify the image. For example, object effects, such as additional shapes or colors, or object shape warping can be applied using the software application. The user may access a tool included with the software application to apply object effects.

Some images contain defective image coloring that may be the result of too little or too much lighting or reflections of light by the object. One example of such defects may be red-eye effect in photographs of human or animal eyes. Red-eye effect can occur when light from a camera flash occurs before an eye pupil closes or becomes smaller. The light is reflected by the retina at the back of the eye. The retina is a blood rich area and reflections can result in a red appearance in the eye. Red-eye effect in non-human animal photographs may be even more pronounced. Many animals include a light-reflecting layer, called the tapetum, behind the retina that improves night vision. Such a layer magnifies red-eye effect and can result in different colors for eyes, such as red, blue, yellow, pink, or green, in animal photographs.

Some computer applications provide tools that can be used to minimize or remove the image defects such as red-eye effects. Conventional computer applications utilize a heuristic process to correct red-eye effects. The heuristic process includes desaturating each pixel associated with the red-eye affected area to a shade of gray and replacing the pixels with a pixels having a more natural color. Such a process can be effective in minimizing or eliminating red-eye effects in some images.

The heuristic process may be ineffective in some image object configurations. For example, when the object is far from the camera or the image was obtained in an environment having low light levels, object eyes may appear as an amber colored glow and the heuristic process tool may be unable to clearly define the boundaries of the red-eye effect area. Other situations in which the heuristic process may be ineffective include when (1) the object is not facing in the direction of the camera; (2) non-human animal eyes that contain bright red-eye effects; and (3) users have difficulty selecting a more natural eye color.

Other examples of defective image coloring include faded or discolored teeth or other facial or body features for human and non-human objects. A heuristic process similar to that used to correct red-eye effects may be applied to such features, but deficiencies such as those noted above may be experienced. Accordingly, a need exists for a tool that can be used to minimize or eliminate image defects in a greater variety of image object situations.

SUMMARY

Certain embodiments of the present invention provide methods and systems for correcting defects in a new image using one or more example images. One embodiment is a method for correcting a new image by providing an example image set that includes information associated with at least one example image. Information associated with the example image can include a corrected example image, an original example image, and an example image mask. The example image mask can include information regarding the pixels in the original example image that were corrected. A new image is received that is any image in addition to the example images and information associated with the example image. The new image is corrected using the information associated with at least one example image. The corrected new image is then outputted, where it can be viewed, approved, or stored by the user.

In some embodiments of the present invention, a new image is provided along with an associated new image mask that indicates which new image pixels are to be corrected. The new image mask may be used to search the example image sets to identify example image masks having a similar shape and/or size as the new image mask. Each new image pixel identified by the new image mask is matched to a pixel in at least one original example image. For each matching original example image pixel, a corresponding pixel in the corrected example image is identified. The new image is corrected by replacing the identified new image pixels with the corrected example image pixels corresponding with the at least one matched original example image pixels.

One embodiment of the present invention is a system for correcting a new image. A display device is provided to display a user interface. A processor-based device that can communicate with the display device is provided that includes an application having an example-based correction engine and example image sets. Each example image set includes an original example image, a corrected example image and an example image mask. The example image mask includes information associated with the original example image pixels that were corrected in the corrected example image. The example-based correction engine is adapted to receive a new image and to provide a new image mask that identifies the new image pixels to correct. The example-based correction engine can correct the new image by matching each new image pixel identified by the new image mask to at least one example image pixel and replacing the each identified new image pixel with a corrected example image pixel that corresponds to the matched original example image pixel.

These embodiments are mentioned not to limit or define the invention, but to provide examples of embodiments of the invention to aid understanding thereof. Embodiments are discussed in the Detailed Description, and further description of the invention is provided there. Advantages offered by the various embodiments of the present invention may be further understood by examining this specification.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Embodiments of the present invention provide methods and systems for correcting new images using example image sets, automatically or with user interaction, to produce corrected images in a manner that can be adapted to individual preferences, different image object orientations, image illumination conditions, and/or human and non-human features. In one illustrative embodiment, each example image set is provided that includes information associated with an example image. The information associated with the example image can include a corrected example image, an original example image, and an example image mask. The example image mask includes information regarding the pixels corrected in the corrected example image. A new image is received that includes a defect that needs to be corrected. The new image may be any image in addition to the images in the example image set. The new image can be corrected using the information associated with the example image.

In some embodiments, a new image mask is generated that identifies the new image pixels that need to be corrected and, optionally, contextual information, such as pixels around the new image pixels that need to be corrected. The new image mask may be used to search a plurality of example image sets and identify those example image sets that include an example image mask that is of similar size and/or shape as the new image mask. The identified example image sets can be used to provide a corrected image pixel to replace a new image pixel that has been identified for correction. In some embodiments, for example, a new image pixel may be matched with an original example image pixel. The corrected image pixel associated with the original example image pixel may be used to replace the new image pixel. Each pixel in the defective area may be replaced with a pixel from a corrected example image that corresponds to matched original example image pixel. Pixels from one or more corrected example images may be used to replace pixels in a defective area.

Illustrative System Implementation

Figure 1:
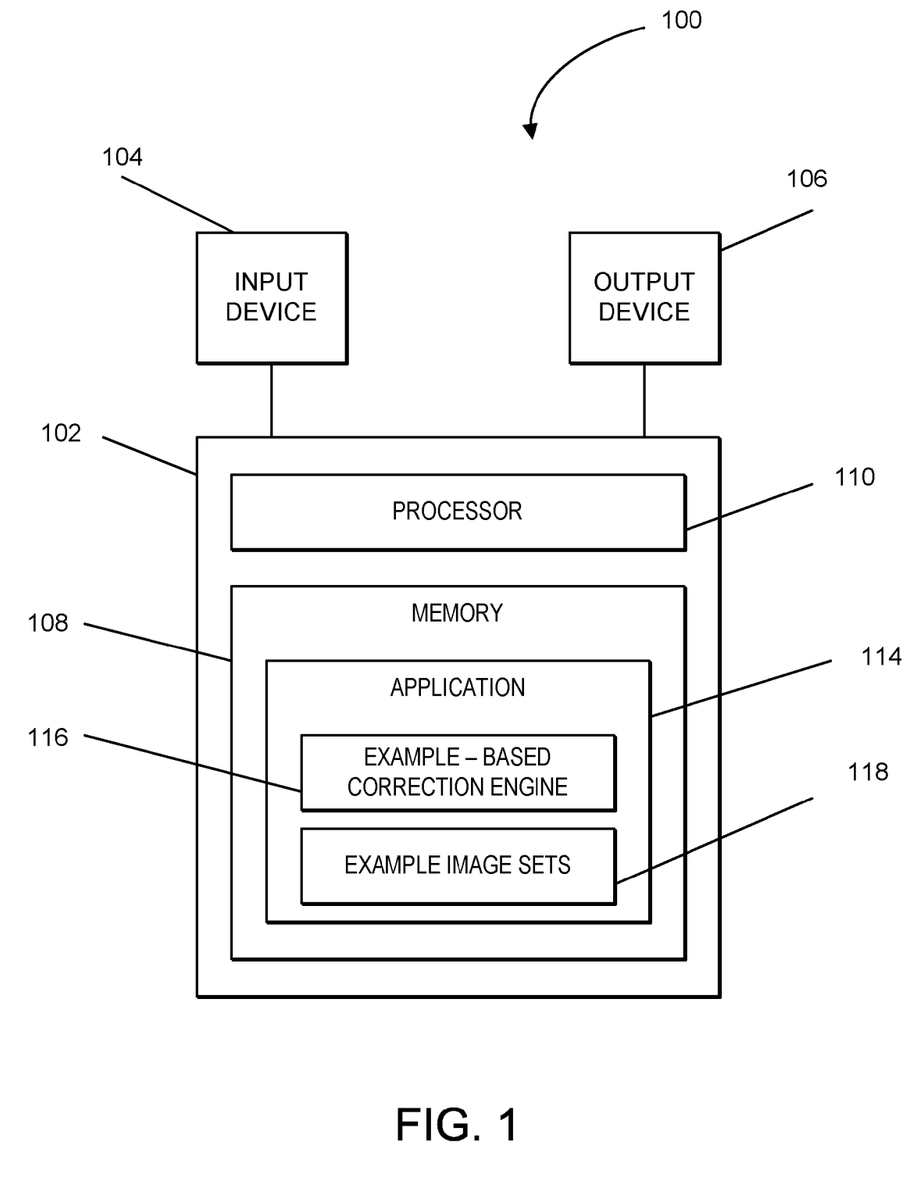
FIG. 1 is a system diagram illustrating a new image correction system according to one embodiment of the present invention.

Methods for providing new image correction can be implemented on any device capable of supporting interaction with a user, such as receiving inputs from the user, storing example image sets, performing a correction to a new image, and outputting a corrected new image to a user interface. FIG. 1 illustrates one embodiment of a system 100 used to implement methods for correcting a new image. The system 100 can include a processor-based device 102 in communication with an input device 104 and an output device 106. The input device 104 can include one or more devices that allow users to input commands into the processor-based device 102 and upload new images and/or example images. Examples of such input devices include a keyboard, a mouse, and an interface that is adapted to be connected to a second device. The output device 106 can receive an output, such as an application user interface, from the processor-based device 102 and display the output to a user. An example of a output device 106 is a monitor that can display a user interface, such as a graphical user interface (GUI). In some embodiments, the input device 104 and/or output device are directly connected to the processor-based device 102. In other embodiments, the input device 104 and/or output device 106 are connected to the processor-based device 102 over a network.

The processor-based device 102 can include a computer-readable medium, such as memory 108, that stores executable code and a processor 110 for executing the executable code. Memory 108 can include one or more applications, such as application 114, that can be executed upon the selection of a command by a user via input device 104. The application 114 may be any type of application that outputs a user interface to the output device 106 and allows users to open files containing images, view images, and modify or edit the images. The application 114 may include an example-based correction engine 116 that can correct a new image based on example image sets 118 stored in memory 108. The example-based correction engine 116 can receive example images along with information associated with the example images and store them as example image sets 118. The example-based correction engine 116 can also receive a new image, identify an area in the new image that needs to be corrected (with or without user interaction), and correct the new image using one or more stored example image sets.

In some embodiments, the example-based correction engine 116 may be a separate application that is executable separate but concurrently with application 114. In some embodiments, the example-based correction engine 116 and example image sets 118 are stored separately from the application 114.

New and Example Images

Images according to some embodiments of the present invention include one or more objects that are represented using pixels having a color value, such as a red-green-blue (RGB) color value. Example images may be from any source, including the user, and are associated with information about the example images. Example images include images which have been previously corrected using any correction method, including manual or automatic correction methods, including correction methods according to various embodiments of the present invention or other methods. Examples of such other methods include a user selecting pixels in a defective area and manually changing the color value associated with each pixel to a desired value.

Information associated with the example images includes the original example image, before being corrected, the corrected example image, and an example image mask. The example image mask identifies pixels that have been corrected in the corrected example image. The example image mask also, optionally, includes contextual pixel information, such as pixels that have not changed between the original example image and the corrected example image, but are located adjacent, in proximity, or close to the pixels that have changed.

The example image sets, including the example image and associated information, can be stored in a computer-readable medium, such as a memory. In some embodiments of the present invention, the example image sets are organized and indexed based on the object feature corrected in the example image. For example, all of the example image sets that include example images for human eyes may be grouped together, while example image sets that include example images for human teeth may be grouped together. Image sets may be grouped based on any number of different characteristics and as broadly and specifically, as desired. For example, all example image sets including eyes, human or non-human, may be grouped together or all example image sets that include blue human eyes may be grouped together.

New images may be any image other than images in the example image sets. New images may be a newly received image or an existing image that the user received or generated at a previous time. New images can be received from any source. Examples of sources include a digital camera, the Internet, magnetic disk, and an image scanner. New images include an area that a user wishes to correct using one or more example image sets.

Illustrative Methods for Correcting New Image Using an Example Image Set

Figure 2:
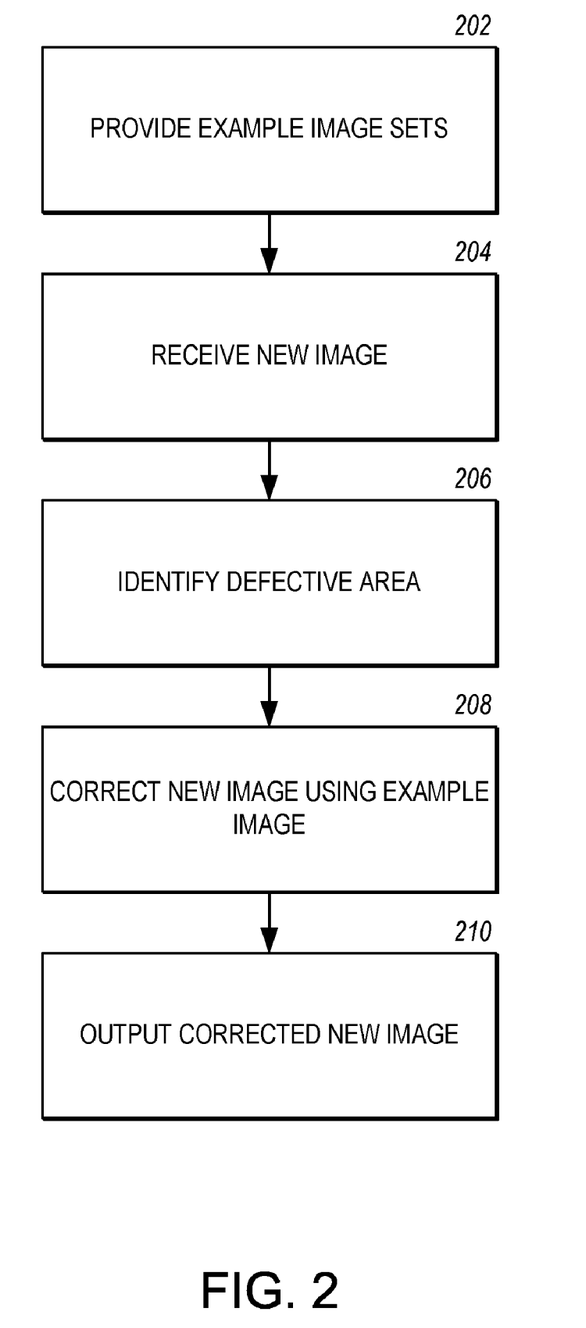
FIG. 2 is a flow chart illustrating one method for correcting a new image according to one embodiment of the present invention.

Various methods according to various embodiments of the present invention can be used to correct a new image using one or more example image sets. FIG. 2 illustrates one embodiment of a method to correct a new image using at least one example image. For purposes of illustration only, the elements of this method are described with references to the system depicted in FIG. 1 and flow charts shown in FIGS. 3-4. A variety of other implementations are possible.

In step 202, example image sets are provided to the processor-based device 102 and stored in memory 108. Example image sets can be provided using one or more different methods and at any time before a new image is corrected. Each example image set may be provided manually by a user or automatically using another correction method. In some embodiments, each example image set is automatically generated and then modified manually. For example, an original example image can be received and modified, manually, or automatically, to correct defects until it is acceptable to a user. In some embodiments of the present invention, pre-corrected example image sets are provided to the processor-based device 102. Each example image set includes an original example image that is uncorrected, a corrected example image, and an example image mask. The example image mask can include information associated with the pixels that changed between the original example image and the corrected example image. Example image vector sets can be derived from the example image set.

Figure 3:
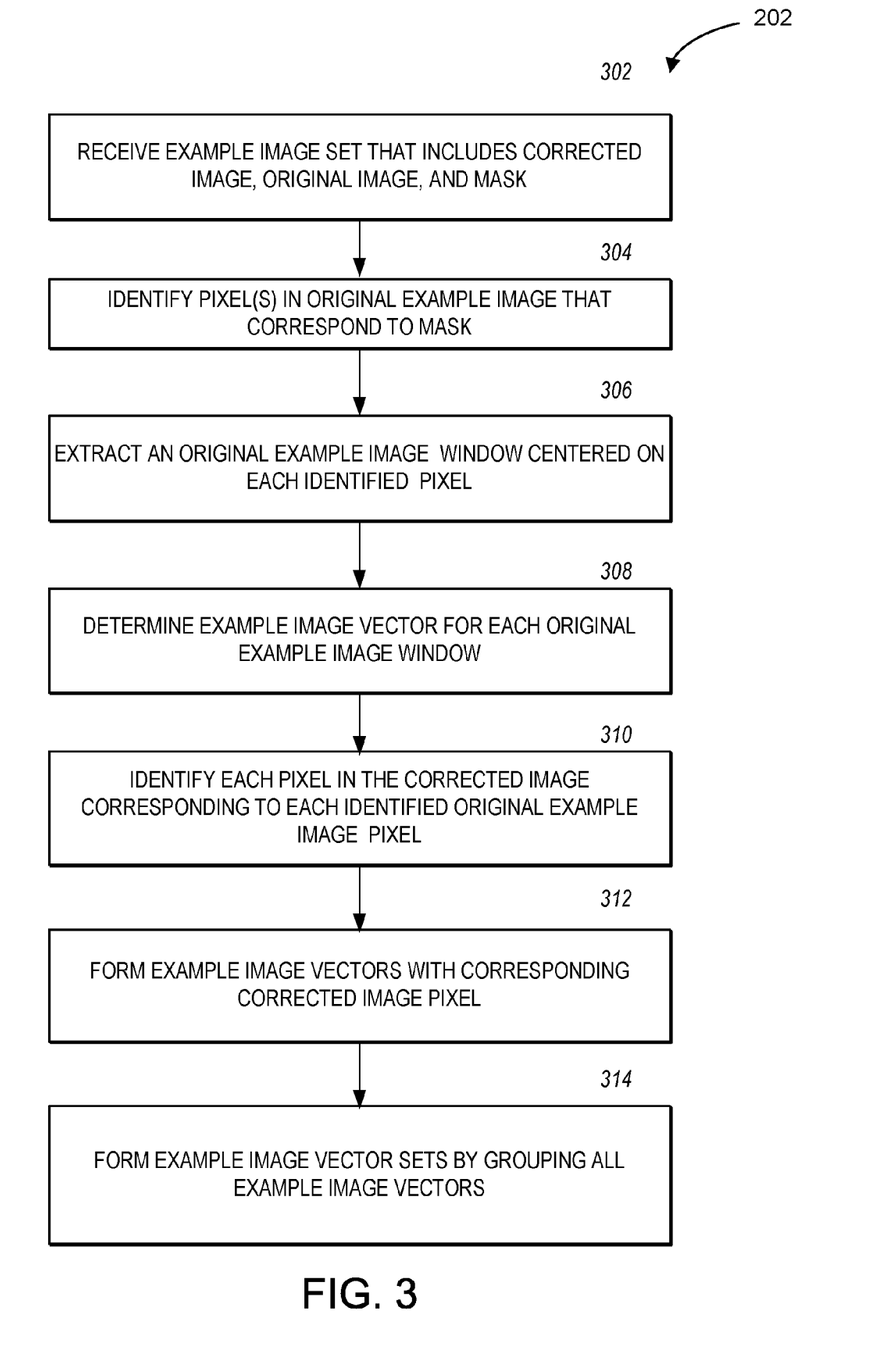
FIG. 3 is a flow chart illustrating one method for forming example image sets according to one embodiment of the present invention.

FIG. 3 shows a flow chart of one method for providing an example image set that includes example image vector sets. The process begins at step 302 by receiving the example image set that includes a corrected example image, original example image, and an example image mask. Each of the corrected example image, original example image, and example image mask include a plurality of pixels representing one or more objects. Each pixel has a color value. In some embodiments, the user can interactively select, add, and modify example image sets. For example, the user can upload an example image and modify it until they are satisfied with its appearance and then save the uploaded example image and associated information as an example image set. One or more pixels in the original example image that correspond to the example image mask are then identified in step 304.

In step 306, an original example pixel window that is centered on an original example pixel is extracted for each identified original example pixel. Each original example pixel window may be a rectangle window having a pre-set radius, for example three pixels, around the pixel for which it was extracted. The window includes information regarding the pixel for which it is extracted and contextual information, such as information regarding pixels adjacent, in proximity, or otherwise around the pixel for which it is extracted. Contextual information can also include the coordinates of the windows, such as the radial distance of the window to the center of the entire original example image and/or angular information. In some embodiments, the radial distances are normalized to a selected scale to promote comparisons with a new image vector.

In step 308, an original example vector is determined for each original example pixel window. The original example vector can be determined based on the following relationship: $3(2R+1)^2$, where R is the radius of the window. The original example vector is one part of an example vector set. The other part of an example vector set can be determined from the corrected example image.

In step 310, each pixel in the corrected example image is identified that corresponds to an original example pixel for which an original example vector has been formed. A corrected example image pixel corresponds to an original example pixel if it has the same coordinates. For example, the example image mask pixels can each include coordinates indicating where, in the entire example image, each original example image pixel is located. Pixel coordinates for each corrected example image pixel can be compared to the original image pixel coordinates to determine if a corrected example image pixel corresponds to an original example image pixel.

An example image vector for each identified pixel in the original example image is formed in step 312 using the example image vector and the corrected example image pixel that corresponds to the original example image pixel for which each of the example image vectors was formed. Once the example image vector is complete, it can be associated with the example image set from which it was generated and stored in memory 108.

After all of the example image vectors for an example image set or for a plurality of example image sets are generated, they can be grouped into an example image vector set in step 314. Each example image vector, formed using an original example image window, is associated with a corrected example image pixel and grouped in the example image vector set with all other example image vector developed for one or more example image sets.

An example image vector set may be generated by various methods, in addition to the method described above with reference to FIG. 3. For example, a transformation step can be performed for each pixel, such as mapping each pixel to a perceptually uniform color space or decomposing the entire image into different frequency channels based on pixel color. In some embodiments, contextual information associated with each window is retained and used to generate example image vectors to include in an example image vector set. Examples of such contextual information include overall mask area size relative to the window, distance from the center of the mask area for each window, and pixel statistics such as brightness for the area surrounding each window. Contextual information can be used to allow a more efficient and accurate search for example image vectors that match a new image vector. Contextual information may also be used to provide continuity parameters and constraints for corrected new image output.

Returning to FIG. 2, a new image is received by the example-based correction engine 116 in step 204. The new image may be an image stored in memory 108 or received from another source via input device 104. The new image may include an area that is defective or otherwise unacceptable for a user. The defective area may be identified manually by the user or automatically in step 206. For example, the new image may be viewed by the user on a user interface included in output device 106. The user can use an input device 104 to select the defective area, such as by using a mouse to draw a boundary defining the defective area. In some embodiments, the example-based correction engine 116 can automatically review the new image and identify possible defective areas based on pixel color and expected pixel color continuity information. The identified defective areas may be displayed to the user, where the user can confirm or dismiss the example-based correction engine's 116 identification of possible defective areas.

Figure 4:
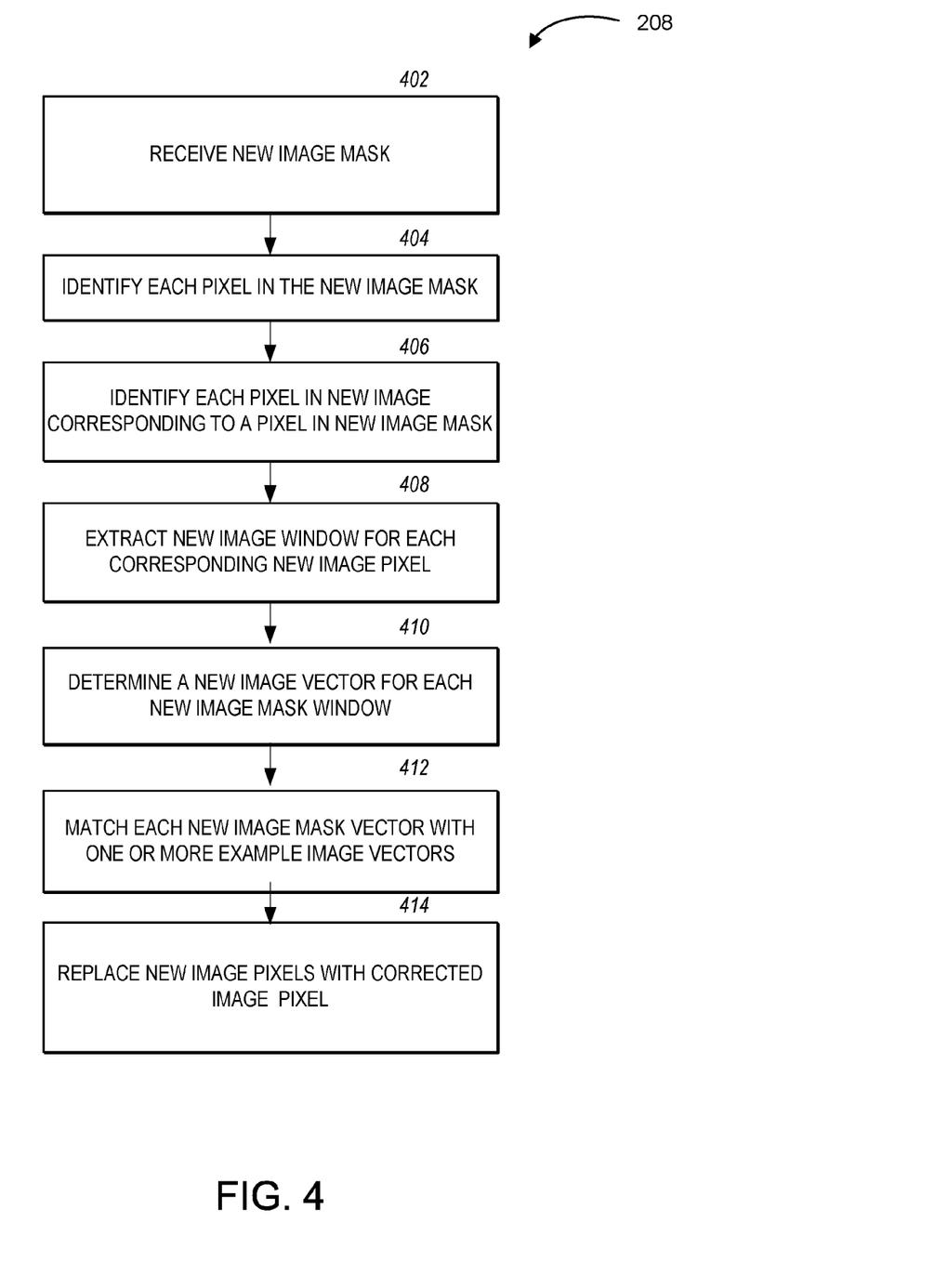
FIG. 4 is a flow chart illustrating one method for correcting a new image using the example image sets according to one embodiment of the present invention.

After the defective area is identified, the new image is corrected, in step 208, using one or more example image vectors in the example image vector set. The new image can be corrected using one or more example-based image correction methods. A flow chart of one example-based image correction method is illustrated in FIG. 4. The process begins at step 402 with the example-based correction engine 116 receiving a new image mask that identifies the defective area in the new image. A new image mask may be developed that includes the location of the pixels in the defective area of the new image. The new image mask includes the pixels in the identified defective area and may be generated by the example-based correction engine 116 after the defective area or areas are identified for correction.

After receiving the new image and new image mask, the example-based correction engine 116 identifies each new image mask pixel in step 404. Each pixel may be identified based on one or more pixel characteristics. Examples of pixel characteristics include pixel color and pixel location in the entire new image. In step 406, the example-based correction engine 116 also identifies each pixel in the new image that corresponds to a pixel in the new image mask. A new image pixel may correspond to a new image mask pixel if the pixels have the same location information.

In step 408, the example-based correction engine 116 extracts a new image window for each pixel that corresponds to a new image mask pixel. The new image window may be a rectangle with a radius of a pre-set number of pixels around the pixel for which the new image window is extracted. An example of a pre-set radius value is three pixels. The window includes pixels in proximity to, surrounding, or otherwise around the pixel for which the window is being extracted to provide contextual information associated with the pixel of interest to assist in the correction process. For example, contextual information assists in allowing pixels to be replaced with pixels having color values that fit with the contextual information. Contextual information can also include the coordinates of the windows, such as the radial distance of the window to the center of the entire new image mask or new image, and/or angular information. In some embodiments, the radial distances are normalized to a selected scale to promote comparisons with example image vectors.

In step 410, the example-based correction engine 116 determines a new image vector for each new image window. The new image vector may be determined using the following relationship: $3(2R+1)^2$, where R is the radius of the new image window. The example-based correction engine 116 may also determine a new image vector for each new image window using the same relationship.

In step 412, the example-based correction engine 116 matches each new image vector with one or more example image vectors in the example image vector set stored in memory 108. Each new image vector may be matched to one or more example image vectors based on one or more characteristics associated with each vector. Characteristics can include color, location, and brightness. In some embodiments, each new image vector is matched to the one or more example image vectors having the least maximum absolute difference across components of each vector. The search for matching example image vectors may be performed using a nearest neighbor search by utilizing a data structure, such as a k-D tree or an approximate nearest neighbor method. For example, contextual information obtained using windows can be used to narrow the search to those example image vectors having contextual information generally close to the contextual information in the new image vector.

In some embodiments, the number of example image vectors searched may be limited manually or automatically. For example, a user can manually narrow the number of original example image mask vectors to search based on their preferences. The new image mask may also be used to limit the number of original example vectors search. The new image mask may be compared with example image masks to identify those example image masks having a size and/or shape similar to the new image mask. The example image vectors associated with the identified example image masks can be selected as the group of example image vectors to search using the new image vector.

In step 414, the example-based correction engine 116 replaces new image pixels with example corrected image pixels. Each example image vector that is matched to the new image vectors, corresponds to a corrected example image pixel. Each new image pixel is replaced with the corrected example image pixel that is associated with the example image vector that is matched to the new image vector.

Returning again to FIG. 2, after the new image is corrected using example images, the example-based image correction engine 116 outputs a corrected new image. The example-based image correction engine 116 can output the corrected new image to a user interface on the output device 106 and allow a user to review the corrected new image. In some embodiments of the present invention, the corrected new image may undergo a post-processing stage. The post-processing stage may include filtering the corrected new image, such as by using a 3×3 median filter and a feathered blend with the uncorrected new image. The user interface can include options allowing a user to approve, store, and/or re-correct the corrected new image. For example, the user can perform changes manually to the corrected new image by changing the color values associated with pixels in the corrected area and/or uncorrected area. In some embodiments of the present invention, the example-based image correction engine 116 stores the new image, corrected new image, and new image mask as an example image set for use in future new image correction processes. For example, the new image may be stored as an original example image, the corrected new image may be stored as an example corrected image, and the new image mask may be stored as a example image mask. The corrected new image, including manual changes made by the user, may be stored as a corrected example image. In some embodiments of the present invention, the corrected new image is automatically stored in memory 108.

In some embodiments of the present invention, contextual information associated with at least some of the new image pixels may be used to limit the number of windows extracted to less than all of the pixels in the new image that correspond to the new image mask. The limited number of windows may be sufficient to match example corrected images to correct the new image. Some embodiments of the present invention also provide for matching example image vectors using more than one window and/or averaging or combining windows.

Image Correction Example

Figure 6A:
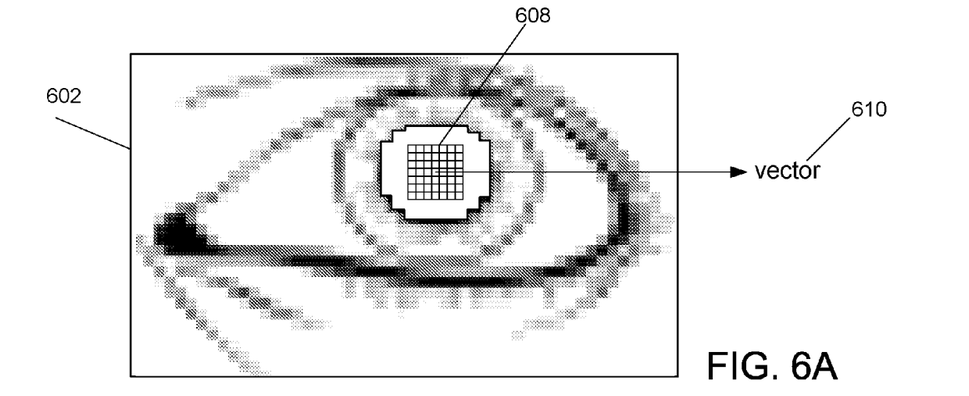
FIG. 6A is an original example image according to one embodiment of the present invention.
Figure 6B:
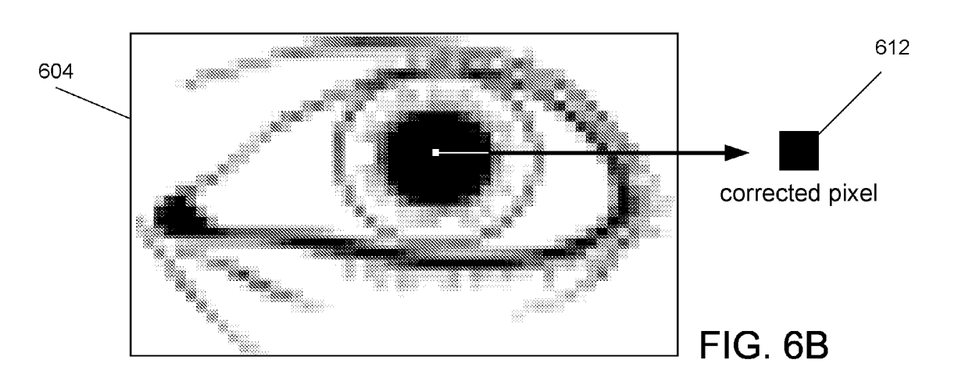
FIG. 6B is a corrected example image according to one embodiment of the present invention.
Figure 6C:
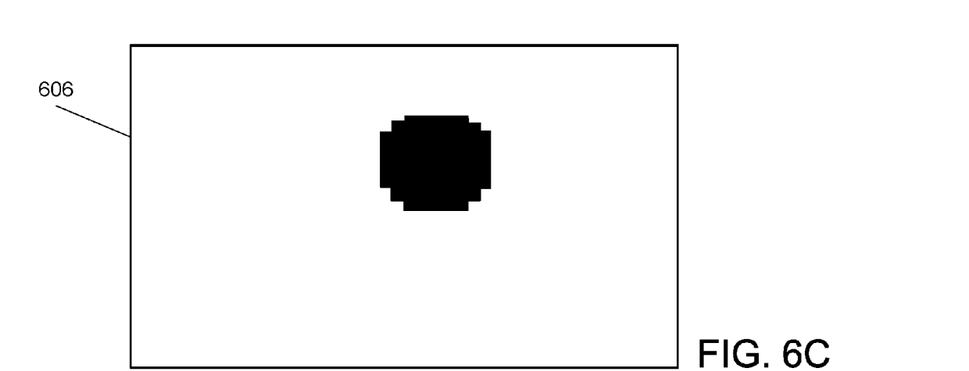
FIG. 6C is an example image mask according to one embodiment of the present invention.
Figure 7:
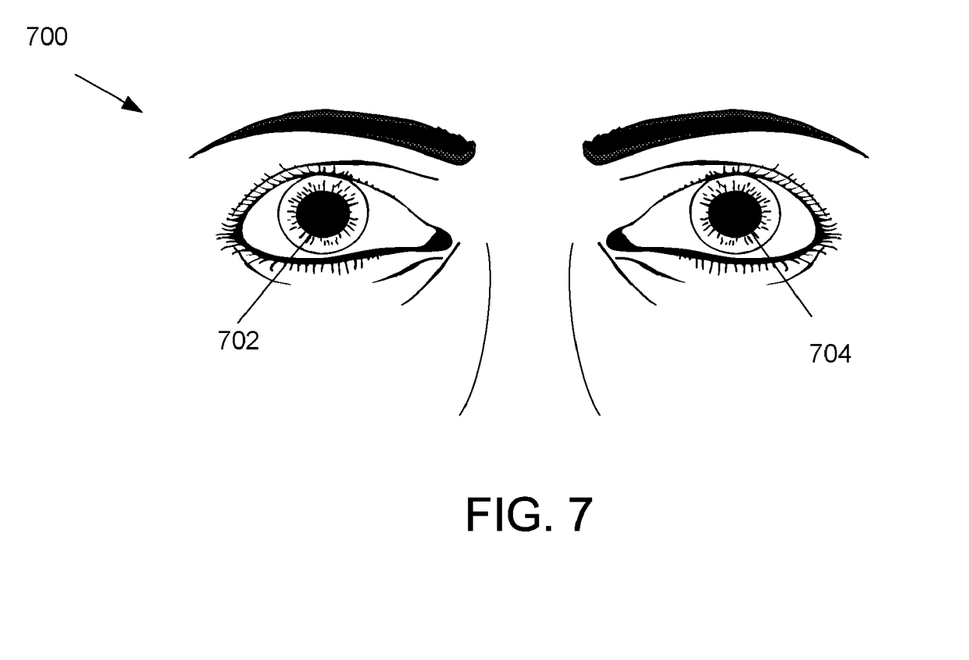
FIG. 7 is a corrected new image with red-eye effects removed according to one embodiment of the present invention.

An example of example-based image correction is discussed below with reference to FIGS. 5-7. Example-based image correction methods according to various embodiments of the present invention may be used to correct images containing human and non-human objects such as human and non-human eyes. As discussed above, images containing human and non-human eyes may experience red-eye effects. Users who wish to correct red-eye effects can utilize various embodiments of the present invention to generate a corrected new image with the red-eye effects removed.

Figure 5:
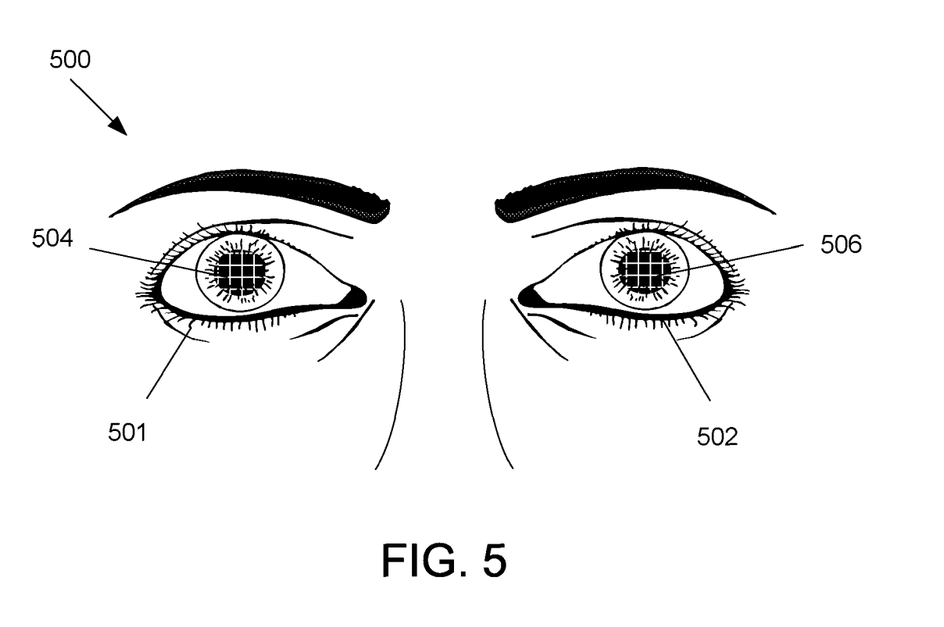
FIG. 5 is an image including objects experiencing red-eye effects according to one embodiment of the present invention.

In FIG. 5, a new image 500 is shown that includes two human eyes 501, 502 experiencing red-eye effects in the area of the eye pupils 504, 506. The new image includes a plurality of pixels, each having an associated RGB color value. The red-eye effects are illustrated with hatched lines, but may appear as red, amber, or otherwise discolored pupils in a color photograph. The new image 500 may be obtained using a digital camera and uploaded to a processor-based device, such as a computer, using a USB port. The user can view the new image 500 by selecting an application, such as ADOBE® Photoshop®, that is stored in memory, and opening a file containing the image 500 using the application. The user can use a mouse to select the defective area, pupils 504, 506 and select a button causing the example-based correction process to begin.

Example image sets may be received or provided. Each example image set includes an original example image, a corrected example image, and an example image mask. The example image sets may be stored in memory and/or formed contemporaneously with receipt of the new image. FIGS. 6A-C show one embodiment of an example image set. The example image set includes an original example image 602, a corrected example image 604, and an example image mask 606. The example image set is of one human eye, but may include two human eyes. The original example image 602, shown in FIG. 6A, includes the eye experiencing red-eye effects in the pupil. Red-eye effects are shown in the original example image 602 using white color in the pupil area. The corrected example image 604, shown in FIG. 6B, shows a pupil with red-eye effects removed and pixels experiencing red-eye effects replaced with pixels having a natural or near-natural color. The example image mask 606, shown in FIG. 6C, identifies the pixels, using location information, from the original example image 602 that have been corrected in corrected example image 604.

An example-based correction engine stored in memory generates an example image vector set based on the information in the example image set. The example-based correction engine automatically extracts an original example image window for each pixel in the original example image 602 that corresponds to the example image mask 606. FIG. 6A shows one original example image window 608 for an original example image pixel that corresponds to a pixel in the example image mask 606. The original example image window 608 has a rectangular shape and includes the pixel of interest and three pixels in each direction around the pixel of interest. The example-based correction engine can extract an example image vector 610 using the original example image window 608. The example-based correction engine can also identify the corrected pixel 612 in the corrected example image 604 that includes the same location information as the pixel for which the example image vector 610 was formed. The example-based correction engine can form an example vector for each pixel in the original example image 602 that corresponds to the example image mask 606. The example vector set can include example image vectors and associated corrected image pixels.

The example-based correction engine can generate a new image vector for each new image pixel that has the same location information as a pixel in the new image mask. The example-based correction engine generates a new image window for each such pixel and extracts a new image vector for each window. The example-based correction engine then automatically searches an example image vector set including the example image vectors. Each new image vector is matched to an example image vector. For one or more new image vectors, the example-based correction engine searches the example image vector sets to find one or more example image vectors that matches the new image vector. The example image vectors may be matched using size and contextual information associated with the new image vector. A matched example image vector is identified for all or some new image vectors. The matched example image vectors may be associated with different example image sets.

The example-based image correction engine identifies the pixels in corrected example images that correspond to matched example image vectors. The pixels in the new image that correspond to the new image vectors are replaced with the corrected example image pixels resulting in a corrected new image. An example of a corrected new image 700 is shown in FIG. 7. The corrected new image 700 can be displayed to the user on the user interface. The corrected new image 700 includes pupils 702, 704 with the pixels experiencing red-eye effects replaced with pixels having a more natural color.

General

The foregoing description of the embodiments of the invention has been presented only for the purpose of illustration and description and is not intended to be exhaustive or to limit the invention to the precise forms disclosed. Numerous modifications and adaptations are apparent to those skilled in the art without departing from the spirit and scope of the invention.

That which is claimed:

1. A method for correcting a new image, the method comprising:
   providing an example image set comprising information associated with at least one example image, the information comprising:
   a corrected example image comprising a plurality of pixels;
   an original example image comprising a plurality of pixels; and
   an example image mask comprising information indicating which original example image pixels are corrected in the corrected example image;
   receiving the new image;
   correcting the new image using the information; and
   outputting a corrected new image.

2. The method of claim 1, wherein the new image comprises pixels having red-eye effects; and
   wherein correcting the new image comprises correcting the pixels having red-eye effects using the information.

3. The method of claim 1, wherein the new image comprises a plurality of pixels, the method further comprising:
   identifying at least part of the new image pixels to correct;
   providing a new image mask based on the new image, the new image mask comprising the identified new image pixels; and wherein correcting the new image comprises replacing at least one new image pixel with a corrected example image pixel.

4. The method of claim 3, further comprising:
searching example image sets using the new image mask to identify example image sets having an example image mask with a similar shape or size as the new image mask.

5. The method of claim 3, wherein correcting the new image comprises replacing each of a plurality of identified new image pixels with a corrected example image pixel.

6. The method of claim 5, wherein replacing each of a plurality of identified new image pixels with a corrected example image pixel comprises replacing identified new image pixels on a pixel-by-pixel basis using pixels from a plurality of corrected example images.

7. The method of claim 1, further comprising:
identifying a pixel in the original example image using the example image mask;
extracting an original example image pixel window centered on the identified original example image pixel;
determining an example image vector for the original example image pixel window;
identifying a corrected example image pixel corresponding to the identified original example image pixel;
associating the identified corrected example image pixel with the example image vector; and
forming an example image vector set comprising the example image vector associated with the identified corrected example image pixel.

8. The method of claim 7, further comprising:
identifying each pixel in the original example image associated with the example image mask;
determining an example image vector for each identified original example image pixel;
associating each example image vector with a corresponding corrected example image pixel; and
wherein the example image vector set comprises each example image vector and associated corrected example image pixel.

9. The method of claim 8, further comprising:
receiving a new image mask associated with the new image, wherein the new image and the new image mask comprise a plurality of pixels;
identifying a new image pixel corresponding to the new image mask;
extracting a new image window for the identified new image pixel;
determining a new image vector for the new image window;
matching the new image vector with an example image vector in the example image vector set;
determining a corrected example image pixel that corresponds to the matched example image vector; and
replacing the new image pixel with the determined corrected example image pixel.

10. The method of claim 1, wherein the information further comprises contextual information for each example image pixel, the method further comprising:
receiving image contextual information for each new image pixel corresponding to a new image mask; and
matching the new image to at least one example image set based on the example image pixel contextual information and new image contextual information.

11. A non-transitory computer-readable recording medium on which is program code for correcting a new image, the non-transitory computer-readable recording medium comprising:

program code for providing at least one example image set, each example image set comprising:
an original example image comprising a plurality of pixels;
a corrected example image comprising a plurality of pixels; and
an example image mask comprising information regarding the pixels changed between the original example image and the corrected example image;
program code for receiving the new image comprising a plurality of pixels;
program code for identifying at least part of the new image pixels to correct;
program code for matching at least one identified new image pixel with an original example image pixel;
program code for correcting the new image by replacing the at least one identified new image pixel with a corrected example image pixel associated with the matched original example image pixel; and
program code for outputting a corrected new image.

12. The non-transitory computer-readable recording medium of claim 11, further comprising:
program code for providing a new image mask based on the new image, the new image mask comprising the identified new image pixels;
program code for identifying at least one example image set comprising an example image mask having a size or shape similar to the new image mask; and
wherein program code for matching at least one identified new image pixel with an original example image pixel comprises matching the original example image pixel associated with an original example image in an identified example image set.

13. The non-transitory computer-readable recording medium of claim 11, wherein the identified new image pixels are replaced with corrected example image pixels on a pixel-by-pixel basis using pixels from a plurality of corrected example images.

14. The non-transitory computer-readable recording medium of claim 11, further comprising:
program code for identifying a pixel in the original example image using the example image mask;
program code for extracting an original example image pixel window centered on the identified original example image pixel;
program code for determining an example image vector for the original example image pixel window;
program code for identifying a pixel in the corrected example image that corresponds to the identified original example image pixel;
program code for associating the identified corrected example image pixel with the example image vector; and
program code for forming an example image vector set comprising the example image vector associated with the identified corrected example image pixel.

15. The non-transitory computer-readable recording medium of claim 14, further comprising:
program code for identifying each pixel in the original example image associated with the example image mask;
program code for determining an example image vector for each identified original example image pixel;
program code associating each example image vector with a corresponding corrected example image pixel; and wherein the example image vector set comprises each example image vector and associated corrected example image pixel.

16. The non-transitory computer-readable recording medium of claim 15, further comprising:
program code for receiving a new image mask associated with the new image, wherein the new image and the new image mask comprise a plurality of pixels;
program code for identifying a new image pixel corresponding to the new image mask;
program code for extracting a new image window for the identified new image pixel;
program code for determining a new image vector for the new image window;
program code matching the new image vector with an example image vector in the example image vector set;
program code for determining a corrected example image pixel that corresponds to the matched example image vector; and
program code for replacing the new image pixel with the determined corrected example image pixel.

17. The non-transitory computer-readable recording medium of claim 11, wherein the new image comprises pixels having red-eye effects, the non-transitory computer-readable recording medium further comprising:
program code for correcting the new image by replacing the pixels having red-eye effects with corrected example image pixels.

18. A system for correcting a new image, the system comprising:
a display device adapted to display a user interface;
a processor-based device comprising an application having an example-based correction engine and example image sets, each example image set comprising:
an original example image comprising a plurality of pixels;
a corrected example image comprising a plurality of pixels; and
an example image mask comprising information associated with the pixels changed between the original example image and the corrected example image; and
the example-based correction engine adapted to receive a new image having a plurality of pixels, at least one pixel being identified as a pixel to correct, wherein the example-based correction engine corrects the new image by replacing the new image pixel to correct with a corrected example image pixel associated with the matched original example image.

19. The system of claim 18, wherein the new image comprises pixels having red-eye effects; and
wherein the example-based correction engine corrects the pixels having red-eye effects using at least one example image set.

20. The system of claim 18, wherein the example-based correction engine generates an example image vector set and a new image vector, the example vector set comprising at least one example image vector and an associated corrected example image pixel, the new image vector being associated with a new image pixel to correct, the example-based correction engine being adapted to match the new image vector with an example image vector and to replace the new image pixel associated with the new image vector with a corrected example image pixel associated with the matching example image vector.

21. The system of claim 20, wherein the example-based correction engine generates an example image vector by:
identifying a pixel in the original example image using the example image mask;
extracting an original example image pixel window centered on the identified original example image pixel; and
determining an example image vector for the original example image pixel window.

22. The system of claim 20, wherein the example-based correction engine generates the new image vector by:
identifying a pixel in the new image mask and a pixel in the new image corresponding to the new image mask pixel;
extracting a new image window for the identified new image pixel; and
determining the new image vector based on the new image window.

23. The system of claim 18, wherein the example-based correction engine outputs a corrected new image.

24. The system of claim 18, wherein the example-based correction engine replaces the identified new image pixels with corrected example image pixels on a pixel-by-pixel basis using pixels from a plurality of corrected example images.

* * * * *